United States Patent
Tanaka et al.

(12)

(10) Patent No.: US 6,183,872 B1
(45) Date of Patent: *Feb. 6, 2001

(54) SILICON-CONTAINING ORGANIC FLUOROPOLYMERS AND USE OF THE SAME

(75) Inventors: Yuji Tanaka; Hitoharu Hachisuka; Takuya Arase; Yoshio Negishi; Masayoshi Tatemoto; Tetsuo Shimizu; Sadaatsu Yamaguchi, all of Settu; Keizo Desaki, Nagoya, all of (JP)

(73) Assignee: Daikin Industries, Ltd., Osaka (JP)

(*) Notice: Under 35 U.S.C. 154(b), the term of this patent shall be extended for 0 days.

This patent is subject to a terminal disclaimer.

(21) Appl. No.: 09/011,579

(22) PCT Filed: Aug. 12, 1996

(86) PCT No.: PCT/JP96/02274

§ 371 Date: Sep. 3, 1998

§ 102(e) Date: Sep. 3, 1998

(87) PCT Pub. No.: WO97/07155

PCT Pub. Date: Feb. 27, 1997

(30) Foreign Application Priority Data

| Aug. 11, 1995 | (JP) | 7-227533 |
|---|---|---|
| Aug. 11, 1995 | (JP) | 7-227534 |
| Aug. 11, 1995 | (JP) | 7-227537 |
| Oct. 2, 1995 | (JP) | 7-279603 |
| Oct. 2, 1995 | (JP) | 7-279604 |
| Oct. 2, 1995 | (JP) | 7-279605 |
| Jan. 24, 1996 | (JP) | 8-031392 |
| Jan. 24, 1996 | (JP) | 8-031393 |
| Jan. 24, 1996 | (JP) | 8-031394 |
| Mar. 1, 1996 | (JP) | 8-071400 |

(51) Int. Cl.$^7$ .................... B32B 17/10; C01B 33/10; C08G 65/32; C08L 71/02; C09D 5/16
(52) U.S. Cl. ............... 428/429; 106/287.13; 106/287.14; 106/287.27; 428/447; 428/451; 524/385; 524/390; 524/462; 524/546; 525/276; 525/288; 525/474; 526/242; 526/279; 528/29; 528/32; 528/42; 427/387
(58) Field of Search .................... 106/287.13, 287.14, 106/287.27; 427/387; 428/215, 336, 337, 412, 429, 447, 451; 524/385, 390, 462, 546; 525/276, 288, 474; 526/242, 279; 528/29, 32, 42

(56) References Cited

U.S. PATENT DOCUMENTS

| 5,081,192 | * | 1/1992 | Tatemoto | ............... 525/288 |
| 5,763,061 | * | 6/1998 | Ochiai et al. | ............... 428/215 |

OTHER PUBLICATIONS

Patent Abstracts of Japan, vol. 016, No. 556, Nov. 26, 1992 & JP 04–213384, Aug. 4, 1992, abstract.

* cited by examiner

Primary Examiner—D. S. Nakarani
(74) Attorney, Agent, or Firm—Pollock, Vande Sande & Amernick

(57) ABSTRACT

Novel silicon-containing organic fluoropolymers which are appliable to materials over a wide range and which have excellent antifouling property. The silicon-containing organic fluoropolymer of the invention is represented by the general formula and has a number average molecular weight of from $5 \times 10^2$ to $1 \times 10^5$:

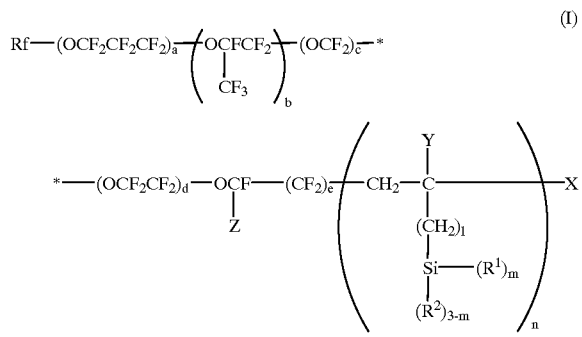

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 2 or above.

16 Claims, No Drawings

SILICON-CONTAINING ORGANIC FLUOROPOLYMERS AND USE OF THE SAME

TECHNICAL FIELD

The present invention relates to a novel silicon-containing organic fluoropolymer never heretofore described in the literatures, and to use thereof. More particularly, the present invention relates to a silicon-containing organic fluoropolymer that has excellent solvent resistance and chemical resistance and is very effective in preventing fouling of the surfaces of various substrates, and to use thereof.

BACKGROUND ART

A variety of organic fluoropolymers comprising a perfluoropolyether chain have unique functional characteristics such as water and oil repellency and low refractive index as well as excellent heat resistance and chemical resistance. They are thus known as polymers of great value added and finding applications in a broad range.

Meanwhile, silane compounds represented by the general formula; $BSi(R)_{3-r}D_r$ [wherein B represents an organic residue reactive to organic compounds including polymers; D represents halogen or alkoxy; R represents alkyl; r represents 1, 2 or 3] are generally known as silane coupling agents and have been used as surface-treating agents for various materials. In addition, the above moiety-terminated polymers are known to undergo hydrolysis by water at room temperature, thereby progressing condensation polymerization or crosslinking for curing [Encyclopedia of Chemical and Technology, Vol. 12, pp. 464 to 569, 1970].

Also known are attempts to modify organic fluoropolymers with such silane compounds. For example, fluorosilicone, fluoroolefin-vinylsilane copolymers, α, ω-bis (dialkyl-chlorosilyl)polyfluoroalkanes, etc. can be mentioned as examples [Journal of Polymer Science, Part-A, Vol. 10, No. 3, pp. 947 to 953].

Japanese Kokai Publication Hei-1-294709 discloses an organic fluoropolymer containing such a vinylsilane unit. This polymer, which has both water repellency and antifouling property, is claimed to be used effectively, for example, in an automotive outside plate coating:

Japanese Kokai Publication Hei-5-339007 discloses a fluorine-containing organosilicon compound as an example of application of said silane compound to an organic fluoropolymer. This compound is characterized in that said silane compound is linked to a perfluoropolyether chain of an organic fluoropolymer and that the carbon atom to which said silane compound is bound is iodinated. This compound, which has low surface energy, is said to be of value as a material for the production of textile finishing agents, mold releasing agents, release agents or antifouling paints.

However, the silane compound-containing organic fluoropolymers so far known are not sufficiently antifouling because only one reactive silicon atom is available at the terminus of the perfluoropolyether chain. The term "antifouling" is used herein to mean both property to reject deposition of fouling matter and property to readily release a deposited fouling matter on washing.

Meanwhile, metal, glass and plastic materials are in broad use as a substrate of automotive parts, OA equipments, household electrical appliances, and among other applications. The exposed surface of those substrates tend to be contaminated by deposits of the airborne dust particles in the car interior or the office or other room, by oily substances originating from food or machine oil, or by fingerprints on handling. Therefore, those substrates must be somehow protected against such fouling and, in addition, rendered ready to wipe off fouling and other deposits.

As an antifouling technology for a glass surface, Japanese Kokai Publication Hei-1-126244 and other literatures disclose a method which comprises coating a glass surface directly with a polymer material such as polydimethylsiloxane or dipping the substrate in such a treating agent for forming a film. Another technology is also known for forming a fluorine-containing unimolecular film on a glass surface by chemisorption.

As an antifouling technology for a metal surface, Japanese Kokoku Publication Hei-7-53913 discloses a method which comprises forming a chromate layer containing a silica sol type silane coupling agent on top of a usual galvanized steel surface and then forming a thin top film using an isocyanate coating composition thereon to provide an organic composite-plated steel sheet.

However, those conventional treatments are not sufficiently effective in protecting substrates against attachment of oily contaminants. Moreover, the substrate surface, which are directly touched by hand, are liable to be contaminated by fingerprints, which cannot be easily wiped off.

Furthermore, those antifouling properties is drastically handicapped under severe conditions such as outdoor exposure so that those technologies are not fully satisfactory in terms of weatherability. In addition, the inevitable use of an expensive fluorine-containing organic solvent in a large amount is a drawback from the standpoint of production cost.

Meanwhile, the surface of substrates used in mobile equipment such as motor vehicles, rolling stock, aircraft, ships, etc., and home and other buildings are exposed to wind and rain during their use. Moreover, in districts frequented by heavy snowfalls or extremely cold climates, particularly in winter months, this surface remain directly exposed to snow and ice for a long time. Furthermore, in special establishments such as cold experiment facilities and certain household electrical appliances such as refrigerators, too, their members are partly exposed to very low temperatures so that waterdrops and moisture in the air are deposited as ice.

When ice is deposited on the surface of car substrate, its functions are adversely affected. Taking a windshield glass as an example, icing interferes with the driver's sight and may cause an accident. When ice is deposited on certain members of the refrigerator and so on, its cooling efficiency is sacrificed to increase a waste of electric energy.

Japanese Kokai Publication Hei-3-158794 discloses a technology for performing an antifogging treatment, which comprises forming a hydrophilic film.

Japanese Kokai Publication Hei-1-126244 discloses a technology for imparting water repellency to a glass surface, which comprises coating the surface directly with an organosilicone compound such as polydimethylsiloxane or dipping it in such a treating agent for forming a film.

Japanese Kokai Publication Hei-4-338147 and Japanese Kokoku Publication Sho-63-24554 disclose a technology for imparting water repellency to a glass surface, which comprises forming a fluoroalkyl-containing silicon oxide film on the surface by chemisorption or in a sol-gel process using a fluoroalkylsilane compound.

However, said antifogging treatment comprising formation of a hydrophilic film is not effective in preventing deposition of ice. In said technology which comprises forming an organosilicone compound film on a glass surface, there is much possibility that this film will be exfoliated in its use because this film is not chemically bound to glass. It is thus poor in durability. Said technology which comprises forming a fluoroalkyl-containing silicon oxide film on a glass surface insures sufficient durability but fails to provide necessary lubricity. Moreover, those technologies as used independently or in combination are not effective in preventing icing even if water repellency is secured.

For preventing icing, it is necessary in the first place to insure that icing will not occur or be hard to occur on a substrate surface in question. However, it is also important to make it easy to remove deposits of ice once formed, in view of the fact that considerable difficulties are involved in removing deposits of ice once formed. Therefore, an anti-icing agent is in demand, which is not only capable of preventing icing itself but allows deposits of ice to be removed with ease.

On the other hand, glass, which possess high optical transmission, insulation property and ornamental characteristic, have been used in a variety of applications such as residential window panes and other architectural members, vehicle members such as car and rolling stock, windshield members for ships and airplanes, among others. In those applications, glass is used in places exposed to the outdoor environment and is often exposed to rain or come in contact with seawater or contaminated water. Moreover, windshield glasses of cars and so on necessitate an important function to secure clear sight. For maintaining sufficient optical transmission, the glass itself has been required to have the property to repel rainwater or the like (this property is referred to as water repellency in this specification).

However, in said technology which comprises forming an organosilicone compound film on a glass surface, there is much possibility that this film will be exfoliated in its use because this film is not chemically bound to glass. It is thus poor in durability. Said technology which comprises forming a fluoroalkyl-containing silicon oxide film on a glass surface insures sufficient durability but fails to provide necessary lubricity and antitackiness. For instance, when the treated glass is used as the windshield of a car, the wipers will emit a beeping noise.

SUMMARY OF THE INVENTION

The first aspect of the present invention, in view of the above-described state of the art, has for its object to provide a novel silicon-containing organic fluoropolymer which is appliable to materials over a wide range and which has excellent antifouling property.

Thus, the first aspect of the present invention is directed to a silicon-containing organic fluoropolymer represented by the general formula (I), which comprises having a number average molecular weight of from $5 \times 10^2$ to $1 \times 10^5$:

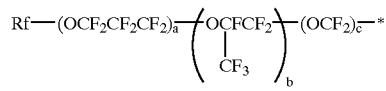

(I)

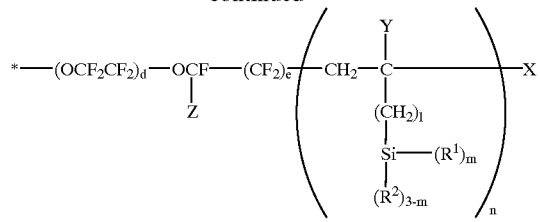

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 2 or above.

The second aspect of the present invention, in view of the above-described state of the art, has for its object to provide an antifouling substrate which is highly resistant to oily fouling matter, particularly fingerprint.

Thus, the second aspect of the present invention is directed to an antifouling substrate which comprises a substrate and, as formed on the surface thereof, a layer of a silicon-containing organic fluoropolymer represented by the general formula (Ix) and having a number average molecular weight of from $5 \times 10^2$ to $1 \times 10^5$:

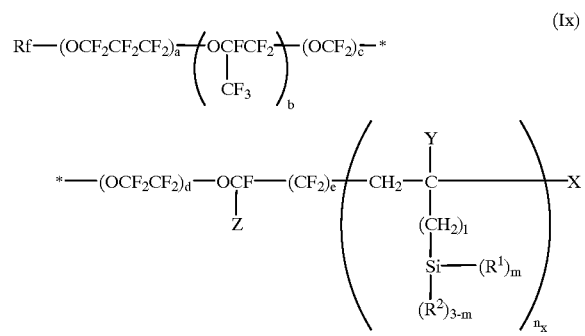

(Ix)

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and $n_x$ represents an integer of 1 or above.

The third aspect of the present invention, in view of the above-described state of the art, has for its object to provide a surface-treating method for imparting sufficient and long-lasting antifouling property and sufficient weatherability to a substrate.

Thus, the third aspect of the present invention is directed to a surface-treating method for a substrate, which comprises coating the substrate surface with a treating solution comprising (1) a silicon-containing organic fluoropolymer represented by the above general formula (Ix), (2) a fluorine-containing organic solvent and (3) a silane compound [excepting said silicon-containing organic fluoropolymer (1)].

The fourth aspect of the present invention, in view of the above-described state of the art, has for its object to provide a surface-treating composition for imparting sufficient and long-lasting antifouling property and sufficient weatherability to a substrate, which has an economic advantage.

Thus, the fourth aspect of the present invention is directed to a surface-treating composition which comprises (1) a silicon-containing organic fluoropolymer of the above general formula (Ix), (2) a fluorine-containing organic solvent and (4) an organic solvent [excepting said fluorine-containing organic solvent (2)].

The fifth aspect of the present invention, in view of the above-described state of the art, has for its object to provide an anti-icing agent which is effective in preventing deposition of ice.

Thus, the fifth aspect of the present invention is directed to an anti-icing agent which comprises a silicon-containing organic fluoropolymer represented by the above general formula (Ix).

The sixth aspect of the present invention, in view of the above-described state of the art, has for its object to provide a glass member having not only sufficient durability, surface lubricity and surface antitackiness but also excellent water repellency.

Thus, the sixth aspect of the present invention is directed to a water-repellent glass member which comprises a glass substrate and, as formed on the glass surface, a layer of a silicon-containing organic fluoropolymer represented by the above general formula (Ix).

DETAILED DESCRIPTION THE INVENTION

The first aspect of the present invention is now described in detail.

The Rf in the above general formula (I) representing said silicon-containing organic fluoropolymer according to the first aspect of the invention is virtually any perfluoroalkyl group capable of being a constituent of an organic fluoropolymer. It includes but is not limited to straight-chain or branched perfluoroalkyl groups containing 1 to 16 carbon atoms. Preferred are $CF_3-$, $C_2F_5-$, and $C_3F_7-$.

The Z in the above general formula (I) may be whichever of fluoro and trifluoromethyl.

The a, b, c, d and e in the above general formula (I) respectively represent the numbers of repetitions of the perfluoropolyether units constituting the main chain of the silicon-containing organic fluoropolymer according to the first aspect of the present invention. They are not limited provided that they each independently represent 0 or an integer of 1 or above and that a+b+c+d+e is not less than 1. Each of them is preferably 0 to 200. Each of them is more preferably 0 to 50, taking into consideration the number average molecular weight of the silicon-containing organic fluoropolymer according to the first aspect of the invention, which is to be described hereinafter. The a+b+c+d+e is preferably 1 to 100.

The order of the repeating units parenthesized by subscripts a, b, c, d and e occurring in the above general formula (I) is only presented for convenience's sake; however, in view of the conventional arrangement of perfluoropolyether chains, the order of combination of those repeating units is not limited to the above order.

The Y in the above general formula (I) represents hydrogen or alkyl containing 1 to 4 carbon atoms. There is no particular limitation on said alkyl containing 1 to 4 carbon atoms but it can include methyl, ethyl, propyl, butyl and the like, regardless of whether straight-chain or branched. The X in the above general formula (I) represents hydrogen, bromo or iodo. When the X is bromo or iodo, the silicon-containing organic fluoropolymer shows enhanced radical reactivity; therefore, this is advantageous in causing it to be linked to other compounds by chemical bonding.

The 1 in the above general formula (I) represents the number of carbon atoms of the alkylene group interposed between the terminal carbon atom of the perfluoropolyether chain and the silicon atom. It represents 0, 1 or 2, preferably 0.

The m in the above general formula (I) represents the number of the substituent $R^1$ bound to silicon in the silicon-containing organic fluoropolymer according to the first aspect of the invention. It represents 1, 2 or 3. The substituent $R^2$ is bound to said silicon in its valence position or positions in which the $R^1$ is not present.

The $R^1$ represents hydroxy or a hydrolyzable substituent. There is no particular limitation on species of said hydrolyzable substituent. Preferred, however, are halogen, $-OR^3$, $-OCOR^3$, $-OC(R^3)=C(R^4)_2$, $-ON=C(R^3)_2$ and $-ON=CR^5$ (wherein $R^3$ represents an aliphatic hydrocarbon group or an aromatic hydrocarbon group; $R^4$ represents hydrogen or an aliphatic hydrocarbon group containing 1 to 4 carbon atoms; and $R^5$ represents a bivalent aliphatic hydrocarbon group containing 3 to 6 carbon atoms), among others. More preferred are chloro, $-OCH_3$ and $-OC_2H_5$.

The $R^2$ represents hydrogen or a monovalent hydrocarbon group. There is no particular limitation on species of said monovalent hydrocarbon group. It preferably includes but is not limited to monovalent aliphatic saturated hydrocarbon groups such as methyl, ethyl, propyl and butyl, inclusive of both straight-chain and branched groups.

The number average molecular weight of the silicon-containing organic fluoropolymer according to the first aspect of the present invention is $5 \times 10^2$ to $1 \times 10^5$. If it is less than $5 \times 10^2$, the polymer will be lacking in characteristics of a polymer and of no practical use. On the other hand, if it exceeds $1 \times 10^5$, the polymer will be of poor processability. Therefore, the above range should be adhered to. The preferred number average molecular weight is $1 \times 10^3$ to $1 \times 10^4$.

The essential feature of the first aspect of the present invention resides in the number of the n in the above general formula (I). The n in the general formula (I) represents the number of reactive silicon atoms contained in the silicon-containing organic fluoropolymer according to the first aspect of the invention. In the first aspect of the invention, the n represents an integer of 2 or above. If it is not greater than 1, antifouling property as the unique effect of the first aspect of the invention will not be sufficiently expressed. Therefore, the n should be limited to 2 or above. There is no particular upper limit to the number of the n only if it is 2 or above but the preferred number is 2 to 10.

The silicon-containing organic fluoropolymer according to the first aspect of the present invention is available as a mixture when a conventional production technology is used for its production. The parameter g in the following general formula (Ia) represents the number of reactive silicon atoms contained in a mixture of the silicon-containing organic fluoropolymers according to the first aspect of the invention. In the mixture of the silicon-containing organic fluoropolymer according to the first aspect of the invention, the g represents 0 or an integer of 1 or above and the mean value of the g in said mixture is greater than 1. If the mean value of the g is not greater than 1, the antifouling property of the polymer will be poor in use as an antifoulant. Therefore, it should be in excess of 1. The preferred mean value of the g is 1.3 to 3 and the particularly preferred one is 1.5 to 2.5.

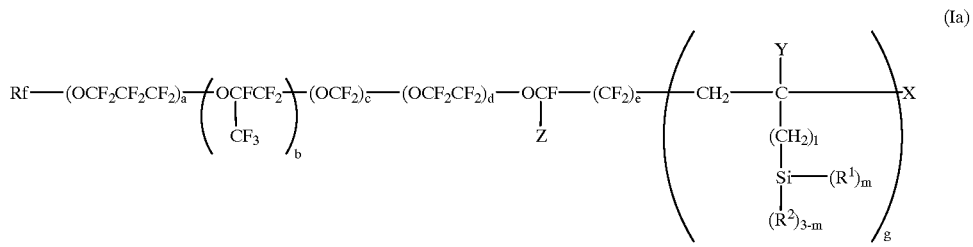

(Ia)

The preferred silicon-containing organic fluoropolymer for use in the first aspect of the present invention includes, for example, a polymer represented by the following general formula (II):

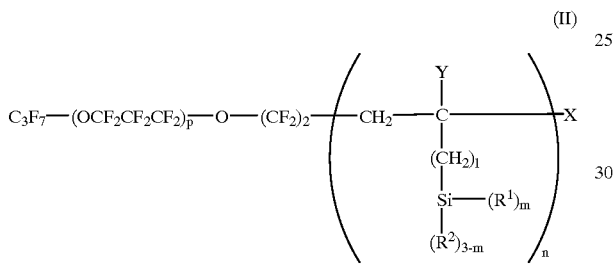

(II)

wherein p represents an integer of 1 or above; Y, X, $R^1$, $R^2$, l, m and n are the same as defined above.

The preferred mixture of the silicon-containing organic fluoropolymers in the first aspect of the present invention includes, for example, a mixture of polymers represented by the following general formula (IIa):

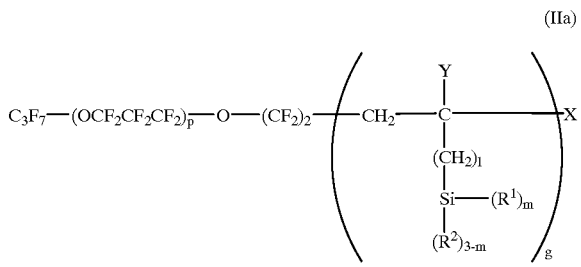

(IIa)

wherein p represents an integer of 1 or above; Y, X, $R^1$, $R^2$, l, m and g are the same as defined above.

The p in the above general formula (II) and (IIa) is not particularly limited only if it is an integer of 1 or above. It is preferably 1 to 200. It is more preferably 1 to 50, taking into consideration the number average molecular weight of the silicon-containing organic fluoropolymer according to the first aspect of the invention.

The silicon-containing organic fluoropolymer according to the first aspect of the invention can be typically obtained from an ordinarily commercial perfluoropolyether by, for example, iodinating its terminus and then, for example, reacting it with a vinylsilane compound represented by the following general formula, wherein Y, $R^1$, $R^2$, l and m are as the same defined above.

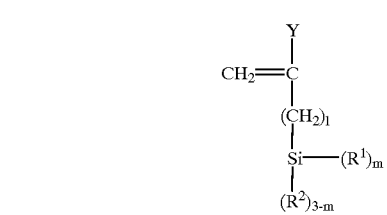

The silicon-containing organic fluoropolymer according to the first aspect of the invention can be used as a universal sealant, coating agent, coupling agent or the like in the fields of housing members and automotive parts. Furthermore, for surface-antifouling purposes, it can be applied advantageously to various substrates such as optical lenses, spectacle lenses, glass products, metallic parts, ceramic products and organic products.

To the silicon-containing organic fluoropolymer according to the first aspect of the invention can be added in use finely divided powders of fillers such as silica, alumina, titanium dioxide, carbon, cement, etc.; alkoxides of titanium, aluminum, silicon, etc.; or fluororesins such as low-molecular-weight polytetrafluoroethylene, tetrafluoroethylene-hexafluoropropylene copolymer, etc. as a hardness regulator or extender. In addition, a conventional crosslinking agent may be added for regulating hardness.

The substrate surface can be coated with the silicon-containing organic fluoropolymer for forming a layer from said silicon-containing organic fluoropolymer. The coating technology used includes but is not limited to spray coating, spin coating, dip coating, roll coating, gravure coating, and curtain flow coating, among other coating techniques.

Dilution of the polymer with a solvent beforehand makes coating easier. There is no particular limitation on species of said solvent used for this purpose. For example, perfluorohexane, perfluoromethylcyclohexane, perfluoro-1,3-dimethylcyclohexane, dichloropentafluoropropane (HCFC225), etc. can be mentioned.

The second aspect of the present invention is now described in detail.

The substrate to which the antifouling substrate of the second aspect of the invention can be applied includes but is not limited to glass, resin, metal, ceramics, wood, porcelain, stone and leather.

Said glass substrate includes virtually all kinds of glass for use as show windows, mirrors, water tanks, window glass panes, cupboard shelves, glass cases, etc.

There is no particular limitation on said resin substrate. Thus, not only natural resins but also synthetic resins are included. Said natural resin includes but is not limited to cellulose and Japanese lacquer. Said synthetic resin includes but is not limited to polyamide resin, polyacrylate resin, poly(amide imide) resin, poly(vinyl acetate) resin, poly (vinyl chloride) resin, phenolic resin, urea resin, melamine resin, epoxy resin, and polyester resin.

There is no particular limitation on species of said metal. For example, iron, zinc, lead, copper and aluminum can be mentioned.

In accordance with the second aspect of the invention, a layer of the silicon-containing organic fluoropolymer, which is represented by said general formula (Ix) and has a number average molecular weight of from $5 \times 10^2$ to $1 \times 10^5$, is formed on the surface of said substrate.

The Rf in the above general formula (Ix) may be substantially any perfluoroalkyl group ordinarily constituting an organic fluoropolymer. It can include but is not limited to straight-chain or branched groups containing 1 to 16 carbon atoms. Preferred are $CF_3$—, $C_2F_5$—, and $C_3F_7$—.

The Z in the above general formula (Ix) may be whichever of fluoro and trifluoromethyl.

The a, b, c, d and e in the above general formula (Ix) respectively represent the numbers of repetitions of the perfluoro(poly)ether units constituting the main chain of the silicon-containing organic fluoropolymer according to the second aspect of the present invention. They are not limited provided that they each independently represent 0 or an integer of 1 or above and that a+b+c+d+e is not less than 1. Each of them is preferably 0 to 200. Each of them is more preferably 0 to 50, taking into consideration the number average molecular weight of the silicon-containing organic fluoropolymer according to the second aspect of the invention, which is to be described hereinafter. The a+b+c+d+e is preferably 1 to 100.

The order of the repeating units parenthesized by subscripts a, b, c, d and e occurring in the above general formula (Ix) is only presented for convenience's sake; however, in view of the conventional arrangement of perfluoropolyether chains, the order of combination of those repeating units is not limited to the above order.

The Y in the above general formula (Ix) represents hydrogen or alkyl containing 1 to 4 carbon atoms. There is no particular limitation on said alkyl containing 1 to 4 carbon atoms but it can include methyl, ethyl, propyl, butyl and the like, regardless of whether straight-chain or branched. The X in the above general formula (Ix) represents hydrogen, bromo or iodo. When the X is bromo or iodo, the silicon-containing organic fluoropolymer shows enhanced radical reactivity; therefore, this is advantageous in causing it to be linked to other compounds by chemical bonding.

The 1 in the above general formula (Ix) represents the number of carbon atoms of the alkylene group interposed between the terminal carbon atom of the perfluoropolyether chain and the silicon atom. It represents 0, 1 or 2, preferably 0.

The m in the above general formula (Ix) represents the number of the substituent $R^1$ bound to silicon in the silicon-containing organic fluoropolymer according to the second aspect of the present invention. It represents 1, 2 or 3. The substituent $R^2$ is bound to said silicon in its valence position or positions in which the $R^1$ is not present.

The $R^1$ represents hydroxy or a hydrolyzable substituent. There is no particular limitation on species of said hydrolyzable substituent. Preferred, however, are halogen, —$OR^3$, —$OCOR^3$, —$OC(R^3)=C(R^4)_2$, —$ON=C(R^3)_2$ and —$ON=CR^5$ (wherein $R^3$ represents an aliphatic hydrocarbon group or an aromatic hydrocarbon group; $R^4$ represents hydrogen or an aliphatic hydrocarbon group containing 1 to 4 carbon atoms; and $R^5$ represents a bivalent aliphatic hydrocarbon group containing 3 to 6 carbon atoms), among others. More preferred are chloro, —$OCH_3$ and —$OC_2H_5$.

The $R^2$ represents hydrogen or a monovalent hydrocarbon group. There is no particular limitation on species of said monovalent hydrocarbon group. It preferably includes but is not limited to monovalent aliphatic saturated hydrocarbon groups such as methyl, ethyl, propyl and butyl, inclusive of both straight-chain and branched groups.

The $n_x$ in the above general formula (Ix) represents an integer of 1 or above. There is particularly no upper limit on the value of the $n_x$ but it is preferably an integer between 1 and 10 in order that the object of the second aspect of the invention may be accomplished.

The $n_x$ represents an integer in the above general formula (Ix); however, the silicon-containing organic fluoropolymer for use in the second aspect of the invention may be a mixture of the polymers of the general formula (Ix) wherein $n_x$s represent a plurality of different integers. When the silicon-containing organic fluoropolymer (Ix) is such a mixture, the $n_x$ can be expressed in mean. The mean value of the $n_x$ is preferably 1.3 to 3 and more preferably 1.5 to 2.5 in consideration of the object of the second aspect of the invention.

The number average molecular weight of the silicon-containing organic fluoropolymer is from $5 \times 10^2$ to $1 \times 10^5$. If it is less than $5 \times 10^2$, the polymer will be lacking in characteristics of a polymer and of no practical use. On the other hand, if it exceeds $1 \times 10^5$, the polymer will be poor in processability. Therefore, the above range should be adhered to. It preferably is from $1 \times 10^3$ to $1 \times 10^4$.

The preferred silicon-containing organic fluoropolymer includes but is not limited to a polymer represented by the following general formula (IIx):

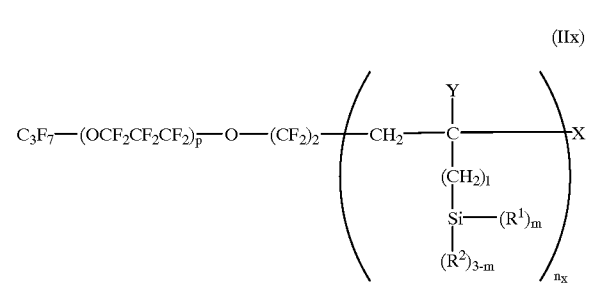

wherein p represents an integer of 1 or above; Y, X, $R^1$, $R^2$, 1, m and $n_x$ are the same as defined above.

Referring to the above general formula (IIx), there is no particular limitation on the value of the p only if it is 1 or above. The p is preferably between 1 and 200. It is more preferably between 1 and 50 in consideration of the number average molecular weight of the silicon-containing organic fluoropolymer according to the second aspect of the invention.

The above silicon-containing organic fluoropolymer can be obtained, for example, by iodinating the terminus of an ordinarily commercial perfluoropolyether and then reacting it with, for example, a vinylsilane compound represented by the following general formula, wherein Y, $R^1$, $R^2$, 1 and m are the same as defined above.

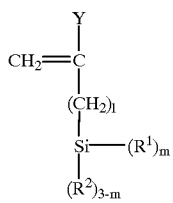

To said silicon-containing organic fluoropolymer can be added in use finely divided powders of fillers such as silica, alumina, titanium dioxide, carbon, cement, etc.; alkoxides of titanium, aluminum, silicon, etc.; or fluororesins such as low-molecular-weight polytetrafluoroethylene, tetrafluoroethylene-hexafluoropropylene copolymer, etc. as a hardness regulator or extender. In addition, a conventional crosslinking agent may be added for regulating hardness.

The substrate surface can be coated with the silicon-containing organic fluoropolymer for forming a layer from said silicon-containing organic fluoropolymer. The coating technology used includes but is not limited to the various coating techniques mentioned for the first aspect of the present invention.

Dilution of the polymer with a solvent facilitates coating. There is no particular limitation on species of said solvent used for this purpose. For example, the solvents mentioned in connection with the corresponding procedure in the first aspect of the invention can be employed.

The thickness of a layer of the silicon-containing organic fluoropolymer in the antifouling substrate according to the second aspect of the invention is not particularly critical but is preferably 0.001 to 0.03 $\mu$m. If it is less than 0.001 $\mu$m, the antifouling property may not be sufficient. Any layer thickness beyond 0.03 $\mu$m may be too great for practical utility.

The glass products, resin products, metal products, ceramic products, etc., which are constituted by the second aspect of the invention, can be used as parts or members which are liable to be contaminated.

The following is a partial list of such parts and members:
Household electrical appliance parts such as fan blades, electronic range doors, refrigerator panels, etc.; office equipment parts such as copying machine contact glass, OHP body mirror, OHP sheet, keyboard, telephone receiver, desk top, etc.; home appliances and furniture such as glasses, cupboard door, looking glass, window panes, lamp shades, chandeliers, etc.; building materials such as show window, telephone box, and water tank glass members; vehicle parts such as rolling stock glass, coated surfaces of vehicle bodies, etc.; personal articles such as spectacle frames, swimming goggle glass, goggles, helmets, clockface glass, etc.; amusement equipment parts and products such as pinball machine glass panels, playing cards, mahjong tiles, etc.; coated surfaces of furniture and pianos;

Personal accessories such as tie pins, necklaces, pierce-type ear-rings, etc.; metal or metal-plated members such as faucets, brasswind and woodwind instruments, golf clubs, door handles, dumbbells, cutters, etc.; ceramic products such as insulators, tiles, toilet fixtures, tableware, roofing tiles, etc.; stone products such as tombstones, go stones, marbles, etc.; paper products such as wallpaper, screen-door paper, books, posters, photographs, etc.; and leather goods such as wallets, boots and shoes, bags, wristwatch bands, baseball gloves, etc.

The third aspect of the present invention is now described in detail.

The surface-treating method according to the third aspect of the invention comprises coating a substrate surface with a treating solution comprising (1) a silicon-containing organic fluoropolymer of the above general formula (Ix), which has been explained in the description of the second aspect of the invention, (2) a fluorine-containing organic solvent and (3) a silane compound.

The first component of the above treating solution is a silicon-containing organic fluoropolymer (1) of the above general formula (Ix). The $n_x$ in said general formula (Ix) represents an integer of 1 or above. There is no upper limit on the value of the $n_x$ but it preferably represents an integer between 1 and 10, in order that the object of the third aspect of the invention may be accomplished.

In the third aspect of the invention, said silicon-containing organic fluoropolymer (1) may be a mixture of the polymers of the above general formula (Ix). When the silicon-containing organic fluoropolymer exists as a mixture, the $n_x$ can be expressed in mean. The mean value of the $n_x$ is preferably from 1.3 to 3 and more preferably 1.5 to 2.5, in consideration of the object of the third aspect of the invention.

The number average molecular weight of said silicon-containing organic fluoropolymer (1) is preferably from $5 \times 10^2$ to $1 \times 10^5$. If it is less than $5 \times 10^2$, the desired effect of the third aspect of the invention may not be expressed. On the other hand, if it exceeds $1 \times 10^5$, processability may be adversely affected. The more preferred range is from $1 \times 10^3$ to $1 \times 10^4$.

The second component of the treating solution for use in the surface-treating method according to the third aspect of the invention is a fluorine-containing organic solvent (2).

This fluorine-containing organic solvent (2) is not particularly critical in kind but includes perfluorohexane, perfluoromethylcyclohexane, perfluoro-1,3-dimethylcyclohexane, and HCFC225, among other solvents. Particularly preferred is HCFC225 in which said silicon-containing organic fluoropolymer (1) is easily soluble and which is readily available.

The third component of the treating solution for use in the surface-treating method according to the third aspect of the invention is a silane compound (3).

This silane compound (3) is not so critical in kind, although said silicon-containing organic fluoropolymer (1) is excluded. Thus, there can be mentioned silicon alkoxides represented by the following general formula (III);

$$\text{Si}(OR^{11})_4 \qquad (III)$$

wherein $R^{11}$ represents an aliphatic hydrocarbon group, the carbon number of which being not particularly limited; and partially hydrolyzed condensation products of the compounds of the above general formula (III). Among them, tetraethoxysilane is particularly preferred in view of its availability.

The proportion of the above respective components (1), (2) and (3), which are constituting the treating solution in use for the surface-treatment method according to the third aspect of the invention, is not particularly restricted but the (1):(2) ratio is preferably from 1:1 to 1:10000 by weight. If the proportion of (1) is too large, the viscosity will be increased so much as to interfere with handling. If it is too small, the antifouling effect will not be sufficient. The more preferred ratio is from 1:4 to 1:1000. On the other hand, the (1):(3) ratio is preferably in the range of from 10:1 to 1:100 by weight. If the proportion of (1) is too large, no sufficient improvement will be realized in weatherability. If it is too small, the antifouling effect will not be sufficient. The more preferred range is from 5:1 to 1:10.

To the treating solution of the third aspect of the present invention can be added in use finely divided powders of a filler, e.g. silica, alumina, titanium dioxide, carbon, cement, etc.; finely divided powders of an alkoxide of titanium, aluminum, or the like; or finely divided powders of a fluororesin, e.g. low-molecular-weight polytetrafluoroethylene, tetrafluoroethylene-hexafluoropropylene copolymer, etc., as a hardness regulator or extender. In addition, the necessary hardness regulation be achieved by adding a conventional crosslinking agent or a cure catalyst, such as water, hydrochloric acid, sulfuric acid, carboxylic acids and sulfonic acids.

In applying said treating solution according to the third aspect of the invention, the substrate surface can be coated with said treating solution. The coating technique includes but is not limited to brush coating, spray coating, spin coating, dip coating, roll coating, gravure coating and curtain flow coating.

There is no particular limitation on the thickness of the layer, which is formed from the treating solution in the surface-treating method according to the third aspect of the invention. The thickness is, however, preferably in the range of from 0.001 to 0.03 $\mu$m. If it is less than 0.01 $\mu$m, the antifouling effect will be insufficient. Conversely if the thickness exceeds 0.03 $\mu$m, the layer will rather interfere with the product function.

The surface-treating method according to the third aspect of the invention includes, in addition to the above-described method, the following method;

An under-layer, which is formed on the substrate surface from a treating solution (N) comprising the silane compound [excluding the silicon-containing organic fluoropolymer (1)] (3), is coated with a treating solution (M) comprising said silicon-containing organic fluoropolymer (1) of the general formula (Ix) and the fluorine-containing organic solvent (2).

The silane compound (3) is diluted with an organic solvent, e.g. methyl alcohol, ethyl alcohol, isopropyl alcohol, ethyl acetate, acetone, etc.; or water to prepare said treating solution (N) with a specific concentration. This concentration is not so critical but is preferably within the range of from 2 to 80% by weight. If it is less than 2% by weight, it will take a long time for a silica sol to be formed, while the use of a concentration in excess of 80% by weight will cause an excessive viscosity build-up to sacrifice workability.

To said treating solution (N) is added a conventional catalyst, e.g. hydrochloric acid, and the mixture is allowed to stand to give a silica sol. The sol is then diluted with said solvent to a concentration suitable for coating. There is no particular limitation on standing time but it may for example be 2 to 10 days. The concentration after dilution is dependent upon the desired thickness of the under-layer but may for example be 0.2 to 2% by weight.

Next, the substrate surface is coated with the diluted treating solution (N). Th coating technology used includes but is not limited to brush coating, spray coating, spin coating, dip coating, roll coating, gravure coating and curtain flow coating. By the above procedure, a silanol polymer gel layer is formed on the substrate surface.

The coated substrate is then heated, whereby an under-layer composed predominantly of silicon oxide is obtained. The necessary heating temperature varies with kinds of the substrate but may for example be from 100 to 300° C. There is no particular limitation on heating time, although it may for example be in the range of 10 minutes to 3 hours. The thickness of the under-layer formed is not particularly critical, either, but is generally within the range of from 0.05 to 0.1 $\mu$m.

Thereafter, the under-layer constructed as above on the substrate surface is coated with the treating solution (M). The coating technology used for this purpose includes brush coating, spray coating, spin coating, dip coating, roll coating, gravure coating and curtain flow coating, among other techniques.

The thickness of the layer formed from said treating solution (M) is not particularly critical but is preferably from 0.001 to 0.03 $\mu$m. If it is less than 0.001 $\mu$m, the antifouling effect will not be sufficient. Any thickness beyond 0.03 $\mu$m will be too great for practical utility.

The substrate to which the surface-treating method of the third aspect of the invention can be applied with advantage includes those members that are liable to be contaminated in use.

The following is a partial list of such members:

Personal accessories such as tie pins, necklaces, pierce-type earrings, etc.; metal or metal-plated members such as faucets, brasswind and woodwind instruments, golf clubs, door handles, dumbbells, cutters, etc.; ceramic products such as insulators, floor tiles, toilet fixtures, tableware, roofing tiles, etc.; stone products such as tombstones, go stones, marbles, etc.; paper products such as wallpaper, screen-door paper, books, posters, photographs, etc.; leather goods such as wallets, boots and shoes, bags, wristwatch bands, baseball gloves, etc.

Household electrical appliance parts such as fan blades, electronic range door, refrigerator panel, etc.: office equipment parts such as copying machine contact glass, OHP body mirror, OHP sheet, keyboards, telephone receivers, desks, etc.; home utensils and furniture such as glasses, cupboard door, looking glass, window panes, lamp shades, chandeliers, etc.; building materials such as show window, telephone box, and water tank glass members; vehicle parts such as rolling stock glass, coated surfaces of vehicle bodies, etc.; personal articles such as spectacle frame, swimming goggle glass, goggles, helmet, clockface glass, etc.; amusement equipment parts and products such as pinball machine glass panels, playing cards, mahjong tiles, etc.; coated surfaces of furniture and pianos.

The surface-treating method according to the third aspect of the invention is characterized in that the antifouling effect is long-lasting and the treated substrates have sufficient weatherability, so that the following substrates, among the above-mentioned substrates, are particularly suited.

Door handles; ceramic materials such as roofing tiles; stone products such as tombstones, go stones, and marbles; copying machine contact glass; window panes; vehicle parts such as rolling stock glass and coated surfaces of vehicles; and amusement products and goods such as pinball machine glass panels, playing cards, mahjong tiles, and so on.

The fourth aspect of the present invention is now described in detail.

The surface-treating composition according to the fourth aspect of the invention comprises (1) a silicon-containing organic fluoropolymer of the general formula (Ix) described hereinbefore in connection with the second aspect of the invention, (2) a fluorine-containing organic solvent and (4) an organic solvent [excluding the fluorine-containing organic solvent (2)].

The first component of the surface-treating composition according to the fourth aspect of the invention is a silicon-containing organic fluoropolymer (1) of the general formula (Ix). The $n_x$ in the general formula (Ix) represents an integer of 1 or above. There is no upper limit to the value of the $n_x$ but it is preferably an integer between 1 and 10, in order to accomplish the object of the fourth aspect of the invention.

In the fourth aspect of the invention, said silicon-containing organic fluoropolymer (1) may be a mixture of the polymers of the general formula (Ix). When said silicon-containing organic fluoropolymer exists as such a mixture, the $n_x$ can be expressed in mean. The mean value of the $n_x$ is preferably from 1.3 to 3 and more preferably from 1.5 to 2.5 in view of the object of the fourth aspect of the invention.

The number average molecular weight of said silicon-containing organic fluoropolymer (1) is preferably from $5 \times 10^2$ to $1 \times 10^5$. If it is less than $5 \times 10^2$, the objective effect of the fourth aspect of the invention will not be expressed. If it exceeds $1 \times 10^5$, processability will be adversely affected. The more preferred molecular weight range is from $1 \times 10^3$ to $1 \times 10^4$.

The second component of the surface-treating composition according to the fourth aspect of the invention is a fluorine-containing organic solvent (2).

The fluorine-containing organic solvent (2) is not particularly limited in kind but includes the species mentioned for the the third aspect of the present invention, among others. Particularly preferred is HCFC225 in which said silicon-containing organic fluoropolymer (1) is easily soluble and which is readily available.

The third component of the surface-treating composition according to the fourth aspect of the invention is an organic solvent (4) [exclusive of said fluorine-containing organic solvent (2)]. This organic solvent (4) is not particularly limited in kind but includes alcohols, ketones, esters, and halogenated (exclusive of fluorinated) hydrocarbons, among others. Particularly preferred are alcohols.

Said alcohols are not particularly limited in kind but includes monohydric alcohols containing 1 to 8 carbon atoms and polyhydric alcohols such as ethylene glycol, glycerol, etc., for example. Among them, preferred are monohydric alcohols containing 1 to 4 carbon atoms and more preferred are isopropyl alcohol because those alcohols are readily available and good solvents for said silicon-containing organic fluoropolymer (1).

Among the respective components of the surface-treating composition according to the fourth aspect of the invention, both the fluorine-containing organic solvent (2) and the organic solvent (4) serve as solvents for the silicon-containing organic fluoropolymer (1). Between the fluorine-containing organic solvent (2) and the organic solvent (4), the fluorine-containing organic solvent (2) is comparatively more expensive and the organic solvent (4) is generally less expensive. Therefore, the surface-treating composition of the fourth aspect of the invention can be provided at a relatively low cost by increasing the proportion of the organic solvent (4) to the fluorine-containing organic solvent (2).

In the surface-treating composition according to the fourth aspect of the present invention, the proportion of the fluorine-containing organic solvent (2) to the organic solvent (4) is preferably within the range of (2):(4)=1:99 to 99:1 by weight. If the proportion of the fluorine-containing organic solvent (2) is smaller than 1% by weight, the solubility of the silicon-containing organic fluoropolymer (1) will be so low that the desired function of the surface-treating composition may not be expressed. On the other hand, if the limit of 99% by weight is exceeded, the production cost of the surface-treating composition of the invention may not be reasonably controlled. The more preferred ratio is from 1:99 to 50:50.

To the surface-treating composition of the fourth aspect of the invention can be added in use finely divided powders of a filler, e.g. silica, alumina, titanium dioxide, carbon, cement, etc.; finely divided powders of an alkoxide of titanium, aluminum, silicon, or the like; or finely divided powders of a fluororesin, e.g. low-molecular-weight polytetrafluoroethylene, tetrafluoroethylene-hexafluoropropylene copolymer, etc., as a hardness regulator or extender. In addition, the necessary hardness regulation can be achieved by adding a conventional crosslinking agent or a cure catalyst, such as water, hydrochloric acid, sulfuric acid, carboxylic acids and sulfonic acids.

In applying the surface-treating composition according to the fourth aspect of the invention, the substrate surface can be coated with said surface-treating composition. The coating technology used is not particularly limited but typically includes the various techniques mentioned for the third aspect of the invention.

The fourth aspect of the invention can also be carried into practice by coating an under-layer, which is formed in advance on the substrate surface from a treating solution comprising a silane compound, with a solvent dilution of said silicon-containing organic fluoropolymer.

Said silane compound is not particularly limited in kind but typically includes the compound (3) mentioned for the third aspect of the present invention, although tetraethoxysilane is particularly preferred in view of its availability.

The silane compound is diluted with an organic solvent, e.g. methyl alcohol, ethyl alcohol, isopropyl alcohol, ethyl acetate, acetone, etc.; or water to prepare a solution with a specific concentration. This concentration is not so critical but is preferably within the range of 2 to 80% by weight. If it is less than 2% by weight, it will take a long time for a silica sol to be formed, while the use of a concentration in excess of 80% by weight will cause an excessive viscosity build-up to sacrifice workability.

To the above solution is added a conventional catalyst, e.g. hydrochloric acid, and the mixture is allowed to stand to give a silica sol. The sol is then diluted with said solvent to a concentration suitable for coating. There is no particular limitation on standing time but it may for example be 2 to 10 days. The concentration after dilution is dependent upon the desired thickness of the under-layer and may for example be from 0.2 to 2% by weight.

Next, the substrate surface is coated with the above diluted solution. The coating technology used is not particularly limited but includes the various techniques mentioned for the third aspect of the present invention. By the above procedure, a silanol polymer gel layer is formed on the substrate surface.

The coated substrate is then heated, whereby an under-layer composed predominantly of silicon oxide is obtained. The necessary heating temperature varies with kinds of the substrates but may for example be from 100 to 300° C. There is no particular limitation on heating time, although it may for example be in the range of 10 minutes to 3 hours. The thickness of the under-layer is not particularly critical, but is generally within the range of from 0.05 to 0.1 μm.

Thereafter, the under-layer constructed as above on the substrate surface is coated with said solvent dilution of the silicon-containing organic fluoropolymer. The coating technology used for this purpose is not particularly limited but includes the techniques mentioned for the third aspect of the present invention.

The thickness of the layer formed from the surface-treating composition of the fourth aspect of the invention is not particularly critical but is preferably from 0.001 to 0.03 μm. If it is less than 0.001 μm, the antifouling effect will not be sufficient. Any thickness beyond 0.03 μm will be too great for practical utility.

The substrate to which the surface-treating method according to the fourth aspect of the invention can be applied with advantage includes those members that are liable to be contaminated in use.

The following is a partial list of such members:

Personal accessories such as tie pins, necklaces, pierce-type earrings, etc.; metal or metal-plated products and members such as faucets, brasswind and woodwind instruments, golf clubs, door handles, dumbbells, cutters, etc.; ceramic products such as insulators, floor tiles, toilet fixtures, tableware, roofing tiles, etc.; stone products such as tombstones, go stones, marbles, etc.; paper products such as wallpaper, screen-door paper, books, posters, photographs, etc.; leather goods such as wallets, boots and shoes, bags, wrist-watch bands, baseball gloves, etc.;

Household electrical appliance parts such as fan blades, electronic range door, refrigerator panel, etc.; office equipment parts such as copying machine contact glass, OHP body mirror, OHP sheet, keyboards, telephone receivers, desks, etc.; home utensils and furniture such as glasses, cupboard door, looking glass, window panes, lamp shades, chandeliers, etc.; building materials such as show window, telephone box, and water tank glass members; vehicle parts such as rolling stock glass, coated surfaces of vehicle bodies, etc.; personal articles such as spectacle frames, swimming goggle glass, goggles, helmet, clockface glass, etc.; amusement equipment parts and products such as pinball machine glass panels, playing cards, mahjong tiles, etc.; coated surfaces of furniture and pianos.

The surface-treating method according to the fourth aspect of the invention is characterized in that the antifouling effect is long-lasting and that the surface-treating composition used can be easily prepared. In this respect, the surface-treating method according to the fourth aspect of the invention can be applied with particular advantage to the following substrates among the above-listed substrates.

Home ware and members such as glasses, cupboard door, looking glass, window panes, lamp shades, chandeliers, etc.; building components and members such as show window, telephone booth, and water tank glass; and vehicle members and parts such as rolling stock glass and coated surfaces of vehicle bodies.

The fifth aspect of the present invention is now described in detail.

The anti-icing agent according to the fifth aspect of the invention comprises a silicon-containing organic fluoropolymer of the general formula (Ix) described hereinbefore in connection with the second aspect of the present invention.

In the above general formula (Ix), the $n_x$ represents an integer of 1 or above. There is no particular upper limit to the value of the $n_x$; however, it is preferably an integer of 1 to 10 in order to achieve the object of the fifth aspect of the invention.

The silicon-containing organic fluoropolymer (1) in the fifth aspect of the invention may be a mixture of the polymers of the above general formula (Ix). When the silicon-containing organic fluoropolymer exists as a mixture, the $n_x$ can be expressed in mean. The mean value of the $n_x$ is preferably from 1.3 to 3 and more preferably from 1.5 to 2.5 in consideration of the object of the fifth aspect of the invention.

The preferred number average molecular weight of said silicon-containing organic fluoropolymer (1) is from $5 \times 10^2$ to $1 \times 10^5$. If it is less than $5 \times 10^2$, the desired effect of the fifth aspect of the invention may not be expressed. On the other hand, if the upper limit of $1 \times 10^5$ is exceeded, processability will be adversely affected. The more preferred range is from $1 \times 10^3$ to $1 \times 10^4$.

To the anti-icing agent of the fifth aspect of the invention can be added finely divided powders of a filler, e.g. silica, alumina, titanium dioxide, carbon, cement, etc.; finely divided powders of an alkoxide of titanium, aluminum, silicon, or the like; ao finely divided powders of a fluororesin, e.g. low-molecular-weight polytetrafluoroethylene, tetrafluoroethylene-hexafluoropropylene copolymer, etc., as a hardness regulator or extender. In addition, the necessary hardness can be sought by adding a conventional crosslinking agent or cure catalyst, such as water, hydrochloric acid, sulfuric acid, carboxylic acids and sulfonic acids.

In applying the anti-icing agent the fifth aspect of the invention, the substrate surface can be coated with said silicon-containing organic fluoropolymer. The coating technology used here is not particularly limited but typically includes the various techniques mentioned for the third aspect of the invention.

Dilution of the polymer with a solvent beforehand makes coating easier. There is no particular limitation on types of the solvent used for this purpose. For example, perfluorohexane, perfluoromethylcyclohexane, perfluoro-1,3-dimethylcyclohexane, HCFC225, etc. can be mentioned.

The fifth aspect of the invention can also be carried into practice by coating an under-layer, which is formed in advance on the surface substrate from a treating solution comprising a silane compound, with a solvent dilution of said silicon-containing organic fluoropolymer.

Said silane compound is not particularly limited in kind but typically includes the silane compounds (3) mentioned hereinbefore in connection with the third aspect of the present invention, although tetraethoxysilane is particularly preferred in view of its availability.

Said silane compound is diluted with an organic solvent, e.g. methyl alcohol, ethyl alcohol, isopropyl alcohol, ethyl acetate, acetone, etc.; or water to prepare a solution with a specific concentration. This concentration is not so critical but is preferably within the range of 2 to 80% by weight. If it is less than 2% by weight, it will take a long time for a silica sol to form, while the use of a concentration in excess of 80% by weight will cause an excessive viscosity build-up to sacrifice workability.

To the above solution is added a conventional catalyst, e.g. hydrochloric acid, and the mixture is allowed to stand so as to give a silica sol. The sol is then diluted with said solvent to a concentration suitable for coating. There is no particular limitation on standing time but it may for example be from 2 to 10 days. The concentration after dilution is dependent upon the desired thickness of the under-layer but may for example be from 0.2 to 2% by weight.

Next, the substrate surface is coated with said diluted solution. The coating technology used is not particularly limited but includes the various techniques mentioned for the third aspect of the present invention. By the above procedure, a silanol polymer gel layer is formed on the substrate surface.

The coated substrate is then heated, whereby an under-layer composed predominantly of silicon oxide is obtained. The necessary heating temperature varies with kinds of the substrate but may for example be from 100 to 300° C. There is no particular limitation on heating time, although it may for example be in the range of 10 minutes to 3 hours. The thickness of the under-layer formed is not particularly critical, either, but is generally within the range of from 0.05 to 0.1 μm.

Thereafter, the under-layer constructed as above on the substrate surface is coated with said solvent dilution of the silicon-containing organic fluoropolymer. The coating technology used for this purpose is not particularly limited but includes the techniques mentioned for the third aspect of the present invention.

The thickness of the silicon-containing organic fluoropolymer layer formed from the anti-icing agent of the fifth aspect of the invention is not particularly critical but is preferably from 0.001 to 0.03 μm. If it is less than 0.001 μm, the anti-icing effect will not be sufficient. Any thickness beyond 0.03 μm will be too great for practical utility.

The substrate to which the anti-icing agent of the fifth aspect of the invention can be applied with advantage is not particularly limited in kind but includes the members and parts of mobile structures such as cars and rolling stock, aircraft, ships, etc., home and other building members, special equipment for freeze-point experiments, and household electrical appliances such as refrigerators. Particularly, the windshield glass for cars, airplanes, ships, etc. is an important substrate, for its ice-up may cause an accident.

The sixth aspect of the present invention is now described in detail.

The water-repellent glass member according to the sixth aspect of the present invention comprises a glass substrate and, as formed on the glass surface, a layer of a silicon-containing organic fluoropolymer (Ix) described for the second aspect of the invention.

The $n_x$ in the above general formula (Ix) represents an integer of 1 or above. There is no upper limit to the value of the $n_x$ but it preferably represents an integer between 1 and 10 in order to achieve the object of the invention.

The silicon-containing organic fluoropolymer (1) in the sixth aspect of the invention may be a mixture of the polymers of the above general formula (Ix). When the silicon-containing organic fluoropolymer exists as a mixture, the $n_x$ can be expressed in mean. The mean value of the $n_x$ is preferably from 1.3 to 3 and more preferably from 1.5 to 2.5 in consideration of the object of the sixth aspect of the invention.

The preferred number average molecular weight of said silicon-containing organic fluoropolymer (1) is from $5 \times 10^2$ to $1 \times 10^5$. If it is less than $5 \times 10^2$, the desired effect of the sixth aspect of the invention may not be expressed. On the other hand, if the upper limit of $1 \times 10^5$ is exceeded, processability will be adversely affected. The more preferred range is from $1 \times 10^3$ to $1 \times 10^4$.

To the silicon-containing organic fluoropolymer can be added in use finely divided powders of a filler, e.g. silica, alumina, titanium dioxide, carbon, cement, etc.; finely divided powders of an alkoxide of titanium, aluminum, silicon, or the like; or finely divided powders of a fluororesin, e.g. low-molecular-weight polytetrafluoroethylene, tetrafluoroethylene-hexafluoropropylene copolymer, etc., as a hardness regulator or extender. In addition, the hardness regulation can be achieved by adding a conventional crosslinking agent or cure catalyst, such as water, hydrochloric acid, sulfuric acid, carboxylic acids and sulfonic acids.

The glass surface can be coated with the silicon-containing organic fluoropolymer in order to form a layer of said silicon-containing organic fluoropolymer. The coating technology used here is not particularly limited but typically includes the various techniques mentioned for the third aspect of the invention.

Dilution of the polymer with a solvent makes coating easier. There is no particular limitation on the type of solvent used for this purpose. For example, the solvents mentioned for the third aspect of the invention can be employed.

The sixth aspect of the invention can also be carried into practice by coating an under-layer, which is formed in advance on the substrate surface from a treating solution of a silane compound, with a solvent dilution of said silicon-containing organic fluoropolymer.

Said silane compound is not particularly limited in kind but typically includes the silane compounds (3) mentioned for the third aspect of the invention, although tetraethoxysilane is particularly preferred in view of its availability.

The silane compound is diluted with an organic solvent, e.g. methyl alcohol, ethyl alcohol, isopropyl alcohol, ethyl acetate, acetone, etc.; or water to prepare a solution with a specific concentration. This concentration is not so critical but is preferably within the range of 2 to 80% by weight. If it is less than 2% by weight, it will take a long time for a silica sol to form, while the use of a concentration in excess of 80% by weight will cause an excessive viscosity build-up to sacrifice workability.

To the above solution is added a conventional catalyst, e.g. hydrochloric acid, and the mixture is allowed to stand to give a silica sol. The sol is then diluted with said solvent to a concentration suitable for coating. There is no particular limitation on standing time but it may for example be from 2 to 10 days. The concentration after dilution is dependent upon the desired thickness of the under-layer but may for example be from 0.2 to 2% by weight.

Next, the substrate surface is coated with said diluted solution. The coating technology used is not particularly limited but includes the various techniques mentioned for the third aspect of the present invention. By the above procedure, a silanol polymer gel layer is formed on the substrate surface.

The coated substrate is then heated, whereby an under-layer composed predominantly of silicon oxide is obtained. The necessary heating temperature varies with kinds of the substrate but generally may for example be from 100 to 300° C. There is no particular limitation on heating time, although it may for example be in the range of 10 minutes to 3 hours. The thickness of the under-layer formed is not particularly critical, either, but is generally within the range of from 0.05 to 0.1 μm.

Thereafter, the under-layer constructed as above on the substrate surface is coated with said solvent dilution of the silicon-containing organic fluoropolymer. The coating technology used for this purpose is not particularly limited, either, but includes the techniques mentioned for the third aspect of the present invention.

The thickness of the silicon-containing organic fluoropolymer layer formed for the water-repellent glass member according to the sixth aspect of the invention is not particularly critical but is preferably from 0.001 to 0.03 μm. If it is less than 0.001 μm, the water-repellent effect will not be sufficient. Any thickness beyond 0.03 μm will be too great for practical utility.

BEST MODE FOR CARRYING OUT THE INVENTION

The following examples and comparative examples are intended to illustrate the present invention in further detail and should by no means be construed as defining the scope of the invention.

SYNTHESIS EXAMPLE 1

A four-necked 2.0-L flask equipped with a stirrer, drip funnel, reflux condenser and thermometer was charged with 2617 g (10.3 mole) of iodine, 213.2 g (1.54 mole) of potassium carbonate and 9,000 g of hexachloro-1,3-butadiene. In a nitrogen steam, 4,000 g (1.03 mole) of ω-fluoropolyperfluorooxetaneacyl fluoride of the chemical formula F—(CF$_2$CF$_2$CF$_2$O)$_n$—CF$_2$CF$_2$COF (average molecular weight of 3,900) was added dropwise at a rate of 10 mL/min. with maintaining at a system temperature of 160° C.

After completion of dropwise addition, the reaction temperature was increased to 185° C. and the reaction was carried out for 20 hours.

After completion of the reaction, the system was cooled down and the potassium salt was filtered off. Then, the bottom layer of the liquid phase was separated using a separately funnel. This layer was washed with several portions of acetone and dissolved in 1 L of perfluorohexane, and the fine insoluble matter was filtered off using a glass filter. The filtrate was distilled under a reduced pressure to remove the volatile matter thoroughly to thereby recover 3,890 g (95% yield) of ω-fluoropolyperfluorooxetane iodide of the chemical formula F—(CF$_2$CF$_2$CF$_2$O)$_n$—CF$_2$CF$_2$I.

Infrared spectrophotometry revealed complete disappearance of the absorption of —C(=O)F at 1890 cm$^{-1}$ and a new absorption of —CF$^2$I at 910 cm$^{-1}$.

SYNTHESIS EXAMPLE 2

A four-necked 200-mL flask equipped with a stirrer, drip funnel, reflux condenser and thermometer was charged with a solution of 40 g of ω-fluoropolyperfluorooxetane iodide of the chemical formula F—(CF$_2$CF$_2$CF$_2$O)$_n$—CF$_2$CF$_2$I as synthesized in Synthesis Example 1 in 80 g of hexafluorotetrachlorobutane [Daiflon Solvent S-316 (manufactured by Daikin Kogyo)] and 1.5 g (1×10$^{-2}$ mole) of di-t-butyl peroxide. The atmosphere of the system was thoroughly purged with nitrogen gas. Then, 16.1 g (0.10 mole) of vinyltrichlorosilane was added dropwise using the drip funnel in a nitrogen stream. After completion of dropwise addition, the system temperature was increased to 120° C. and the reaction was carried out for 4 hours. After completion of the reaction, the volatile fraction was completely distilled off under a reduced pressure to provide 38.7 g (90% yield) of iodine-terminated silicon-containing organic fluoropolymer (A).

SYNTHESIS EXAMPLE 3

A four-necked 200-mL flask equipped with a stirrer, drip funnel, reflux condenser and thermometer was charged with a solution of 34.4 g (8×10$^{-3}$ mole) of the silicon-containing organic fluoropolymer (A) synthesized in Synthesis Example 2 in 50 g of perfluorohexane, and 2.1 g (3.2×10$^{-2}$ mole) of zinc was dispersed with intense stirring. After the system was cooled on an ice-water bath, 10 g of anhydrous methanol was added dropwise in a nitrogen stream.

After completion of dropwise addition, the ice-water bath was removed and the reaction was carried out under reflux for 2 hours. The insoluble matter was then filtered off and the bottom layer of the liquid phase was separated using a separatory funnel. This solution was washed with 3 portions of anhydrous methanol and distilled under a reduced pressure to remove the volatile fraction thoroughly. As a result, 31.6 g (92% yield) of a hydrogen-terminated silicon-containing organic fluoropolymer (B) was obtained.

$^1$H-NMR analysis revealed a broad signal assignable to the hydrogen atoms indicated in the following formula at 1.2 to 3.0 ppm. As measured with 5.0 mole % of ω-fluoroperfluorooxetane hydride added as an internal standard and calculated by means of the following computation formula, the degree of polymerization was 2.0.

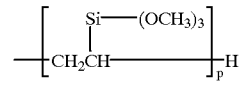

I/I$_s$=[0.95(3P+1)]/0.05

I: integral absorption intensity at 1.2 to 3.0 ppm
I$_s$: integral absorption intensity of internal standard
P: degree of polymerization

SYNTHESIS EXAMPLE 4

The procedure of Synthesis Example 2 was repeated except that di-t-butyl peroxide was used in a proportion of 0.29 g (2×10$^{-3}$ mole) to provide a silicon-containing organic fluoropolymer (C).

SYNTHESIS EXAMPLE 5

Using the silicon-containing organic fluoropolymer (C), the procedure of Synthesis Example 3 was otherwise repeated. The degree of polymerization of the resulting silicon-containing organic fluoropolymer (D) as determined in the same manner as in Synthesis Example 3 was 1.0.

EXAMPLE 1 AND COMPARATIVE EXAMPLES 1 AND 2

The polymers obtained in Synthesis Examples 3 and 5 and the commercial fluorine-containing silane coupling agent KBM7803 [C$_8$F$_{17}$CH$_2$CH$_2$Si(OCH$_3$)$_3$, manufactured by Shin-Etsu Chemical] (hereinafter referred to briefly as the commercial product) were respectively dissolved in perfluorohexane to provide treating solutions with 0.1% by weight concentrations. Meanwhile, substrate glass sheets were rinsed with water and, then, washed thoroughly with methanol and acetone. The glass sheets thus prepared were dipped in the treating solutions for 10 seconds, raised, and air-dried for 60 minutes. Then, the sheets were subjected to sonic washing in perfluorohexane for 5 minutes to eliminate the excess molecules of the treating solutions and, then, air-dried for use in evaluations.

The evaluations were made by the following methods.
(1) Fingerprint Receptivity:
A fingerprint was taken on each sample and the ease of fingerprint taking was visually evaluated.
○: The fingerprint can hardly be taken and the impression formed is not conspicuous.
X: The fingerprint taken is comparable to that on the untreated glass sheet.
Δ: Equivocal
(2) Fingerprint Erasability:
The surface of the sample used for the evaluation of fingerprint receptivity was wiped with Kimwipe (Jujo-Kimberley) in one reciprocation and the ease of erasing the fingerprint was visually evaluated.
○: The fingerprint can be completely wiped off.
Δ: Traces of the fingerprint remain after wiping.
X: Traces of the fingerprint spread upon wiping and cannot be easily removed.
(3) The Contact Angle for Water was Measured by Sessile Drop Method with a Contact Angle Microscope (CA-DT, Manufactured by Kyowa Interface Scientific Instruments).

The results of the respective evaluations are shown in Table 1.

TABLE 1

|  | Sample for evaluation | Finger-print receptivity | Finger-print erasability | Contact angle for water |
|---|---|---|---|---|
| Example 1 | Synthesis Example 3 | ○ | ○ | 113° |
| Comparative Example 1 | Synthesis Example 5 | Δ | ○ | 110° |
| Comparative Example 2 | Commercial product | Δ | X | 110° |

EXAMPLE 2 AND COMPARATIVE EXAMPLE 3

The polymer obtained in Synthesis Example 3 and the commercial product were respectively dissolved in perfluorohexane to prepare treating solutions with 0.1% by weight concentrations. Aluminum sheets [0.5 mm, as specified in JIS H4000 (A1050P)] as substrates were rinsed with water and then washed well with methanol and acetone. The aluminum sheets thus prepared were dipped in the treating solutions, raised, and air-dried for 60 minutes. The sheets were then subjected to sonic washing in perfluorohexane for 5 minutes to remove the excess molecules of the treating solutions and air-dried for use in evaluations.

COMPARATIVE EXAMPLE 4

Separately, untreated aluminum sheets were provided.

Evaluations were made according to the following criteria.

The surface of each sample was repeatedly wiped with a hand-held Kimwipe (Jujo-Kimberley) with a medium degree of force in 100 reciprocations. The contact angle for water before wiping and the contact angle for water after completion of wiping were respectively measured. The contact angles for water was measured by sessile drop method with a contact angle microscope (CA-DT, Kyowa Interface Scientific Instruments).

The results of evaluations are shown in Table 2.

TABLE 2

|  | Sample for evaluation | Contact angle for water before wiping | Contact angle for water after wiping |
|---|---|---|---|
| Example 2 | Synthesis Example 3 | 114° | 108° |
| Comparative Example 3 | Commercial product | 111° | 98° |
| Comparative Example 4 | Untreated sheet | 88° | — |

EXAMPLE 4

A treating solution was prepared by mixing 0.1% by weight of silicon-containing organic fluoropolymer (B) synthesized in Synthesis Example 3 with 99.8% by weight of HCFC225 and 0.1% by weight of tetraethoxysilane.

A glass sheet was washed with water and then washed thoroughly with methanol and acetone. The glass sheets thus prepared were dipped in the above treating solution for 1 minute, raised, and allowed to stand at 60° C. and 80% RH for 60 minutes. The sheets were then washed with HCFC225 well to remove the excess molecules of the treating solution.

The samples thus prepared were subjected to an accelerated weathering test in the I-super UV tester (SUV-W13, manufactured by Iwasaki Electric) for 161 hours (equivalent to 3.3 years) and the contact angles for water were measured before and after the test by sessile drop method with a contact angle microscope (CA-DT, Kyowa Interface Scientific Instruments). The results are shown in Table 3.

COMPARATIVE EXAMPLE 5

A treating solution was prepared in the same manner as in Example 3 except that 0.1% by weight of the silicon-containing organic fluoropolymer (B) obtained in Synthesis Example 3 was mixed with 99.9% by weight of HCFC225. The treating solution thus prepared was subjected to the same test as in Example 3. The results are shown in Table 3.

TABLE 3

|  | Contact angle for water | |
|---|---|---|
|  | Before test | After test |
| Example 3 | 114° | 109° |
| Comparative Example 5 | 112° | 101° |

EXAMPLE 4

A surface-treating composition was prepared by mixing 0.1% by weight of the silicon-containing organic fluoropolymer (B) with 99.9% by weight of a mixture of 10% by weight of HCFC225 and 90% by weight of isopropyl alcohol.

Meanwhile, glass sheets were rinsed with water and then washed thoroughly with methanol and acetone. The glass sheets thus prepared were dipped in the above surface-treating composition for 1 minute, raised, and allowed to stand at 60° C. and 90% RH for 24 hours. The sheets were then washed well with HCFC225 to remove the excess molecules of the surface-treating composition.

COMPARATIVE EXAMPLE 6

A surface-treating composition was prepared by mixing 0.1% by weight of the silicon-containing organic fluoropolymer (B) with 99.9% by weight of HCFC225 in otherwise the same manner as in Example 4 and subjected to the same test as described. The results are shown in Table 4.

TABLE 4

|  | Contact angle for water |
|---|---|
| Example 4 | 113° |
| Comparative Example 6 | 113° |

COMPARATIVE EXAMPLE 7

It was attempted to prepare a surface-treating composition by mixing 0.1% by weight of the silicon-containing organic fluoropolymer (B) with 99.9% by weight of isopropyl alcohol. However, the two components were immiscible, failing to give a useful surface-treating composition.

EXAMPLE 5

The polymer obtained in Synthesis Example 3 was dissolved in perfluorohexane to prepare a treating solution with a 0.1% by weight concentration. Glass sheets were rinsed with water and then washed thoroughly with methanol and acetone. The glass sheets thus prepared were dipped in the above treating solution for 10 seconds, raised, and air-dried for 60 minutes. The sheets were then subjected to sonic washing in perfluorohexane for 5 minutes to remove the excess molecules of the treating solution and air-dried.

The treated glass sheets were allowed to stand on dry ice in an atmosphere controlled at 20° C. and 70% RH to let a deposit of ice form in a thickness of about 0.2 mm on the glass surface.

The iced surface of each glass sheet was gently rubbed against using a polyethylene spatula in a few reciprocations to remove the deposit of ice to evaluate the anti-icing effect. The following evaluation criteria were used.

O: The deposit of ice can be easily scraped off to expose the glass surface completely.

Δ: The glass surface can be exposed but the deposit of ice remains locally.

X: The glass surface cannot be exposed.

The results are shown in Table 5.

COMPARATIVE EXAMPLE 8

The commercial product was dissolved in perfluorohexane to prepare a treating solution with a 0.1% by weight concentration. Meanwhile, glass sheets were rinsed with water and then washed thoroughly with methanol and acetone. The glass sheets thus prepared were dipped in the above treating solution for 10 seconds, raised, and air-dried for 60 minutes. The glass sheets were then subjected to sonic washing in perfluorohexane for 5 minutes to remove the excess molecules of the treating solution and air-dried.

The treated glass sheets were allowed to stand on dry ice in an atmosphere controlled at 20° C. and 70% RH to let a deposit of ice form in a thickness of about 0.2 mm on the glass surface.

The anti-icing effect was evaluated just as in Example 5.

The results are shown in Table 5.

COMPARATIVE EXAMPLE 9

Glass sheets, which was rinsed with water and thoroughly washed with methanol and acetone, were allowed to sit on dry ice in an atmosphere at 20° C. and 70% RH to let deposits of ice form in a thickness of about 0.2 mm.

The anti-icing effect was evaluated just as in Example 5.

The results are shown in Table 5.

TABLE 5

| | Sample | Evaluation |
| --- | --- | --- |
| Example 5 | Synthesis Example 3 | O |
| Comparative Example 8 | Commercial product | Δ |
| Comparative Example 9 | — | X |

EXAMPLE 6 AND COMPARATIVE EXAMPLE 10

The polymer obtained in Synthesis Example 3 and the commercial product were respectively dissolved in perfluorohexane to prepare treating solutions with 0.1% by weight concentrations. Meanwhile, glass sheets were rinsed with water and then washed thoroughly with methanol and acetone. The glass sheets thus prepared were dipped in the treating solutions for 10 seconds, raised, and air-dried for 60 minutes. The sheets were then subjected to sonic washing in perfluorohexane for 5 minutes to remove the excess molecules of the treating solution and air-dried for use in evaluations.

The contact angle for water and waterdrop tumbling-down angle were measured by sessile drop method with a contact angle microscope (CA-DT, Kyowa Interface Scientific Instruments).

The peel strength was measured with a commercial cellophane tape (18 mm wide, manufactured by Sekisui Chemical Co., Ltd.) at a pulling speed of 50 mm/second.

TABLE 6

| | Sample | Contact angle for water | Waterdrop tumbling-down angle | Peel strength |
| --- | --- | --- | --- | --- |
| Example 6 | Synthesis Example 3 | 111° | 14° | 123 g |
| Comparative Example 10 | Commercial product | 110° | ≧30° | 213 g |

INDUSTRIAL APPLICABILITY

The fluorine-containing polymer according to the first aspect of the present invention, the construction of which has been described hereinbefore, is very satisfactory in antifouling property, particularly against fingerprint, and contact angle for water, so that it can be used with advantage in a broad range of applications such as optical lenses, spectacle lenses, and glass, metal, ceramic, and organic parts or members.

The antifouling substrate according to the second aspect of the present invention, the construction of which has been described hereinbefore, is very satisfactory in antifouling property, particularly against fingerprint, so that is can be used with advantage in the fields of glass, resin, metal, ceramics, wood, porcelain, stoneware and leather.

The surface-treating method according to the third aspect of the present invention, the construction of which has been described hereinbefore, provides a sufficient and lasting antifouling effect as well as sufficient weatherability and, as such, can be used with advantage in the field of products which must be protected against fouling under outdoor and other rugged conditions.

The surface-treating composition according to the fourth aspect of the present invention, the construction of which has been described hereinbefore, insures a sufficient and long-lasting antifouling effect, as well as high weatherability, and is inexpensive, so that it is particularly suited for universal use.

The anti-icing agent according to the fifth aspect of the present invention, the construction of which has been described hereinbefore, is effective in preventing deposition of ice and insures ease of removing deposits of ice.

The water-repellent glass member according to the sixth aspect of the present invention, the construction of which has been described hereinbefore, is outstanding in durability, surface lubricity and surface antitackiness, besides being highly water-repellent, so that it can be used with advantage as windshield glass for buildings, cars, ships, and aircraft, among others.

What is claimed is:

1. A silicon-containing organic fluoropolymer represented by the general formula (I), which comprises having a number average molecular weight of from $5\times10^2$ to $1\times10^5$:

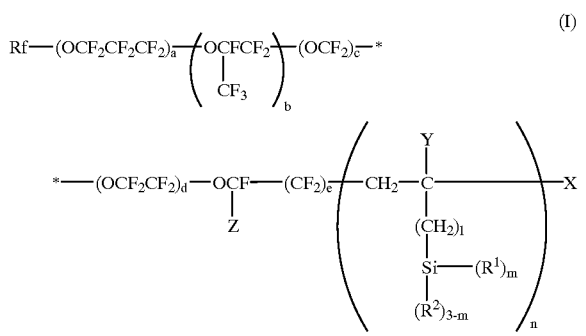

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 2 or above.

2. A mixture of silicon-containing organic fluoropolymers represented by the general formula (Ia) and having a number average molecular weight of from $5\times10^2$ to $1\times10^5$, wherein g is 0 or an integer of 1 or above and the mean value of the g is greater than 1 in said mixture provided said mixture of silicon-containing organic fluoropolymers contains a silicon-containing organic fluoropolymer wherein the g is an integer of 2 or above:

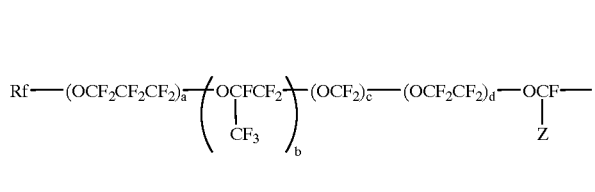

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; and m represents 1, 2 or 3.

3. The silicon-containing organic fluoropolymer according to claim 1, which is a polymer represented by the general formula (II) and having a number average molecular weight of from $5\times10^2$ to $1\times10^5$:

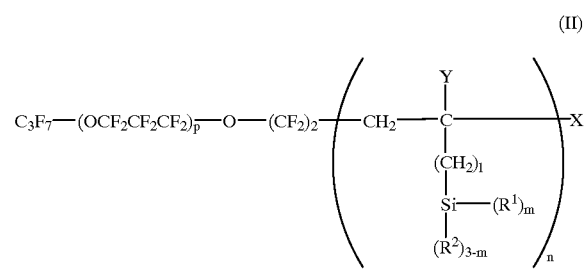

wherein p represents an integer of 1 or above; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n represents an integer of 2 or above.

4. A mixture of silicon-containing organic fluoropolymers represented by the general formula (IIa) and having a number average molecular weight of from $5\times10^2$ to $1\times10^5$, wherein g is 0 or an integer of 1 or above and the mean value of the g is greater than 1 in said mixture, provided said mixture of silicon-containing organic fluoropolymers contains a silicon-containing organic fluoropolymer wherein the g is an integer of 2 or above:

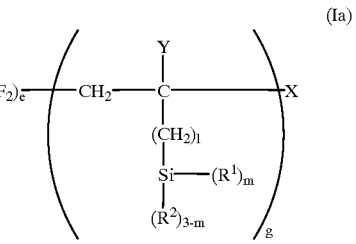

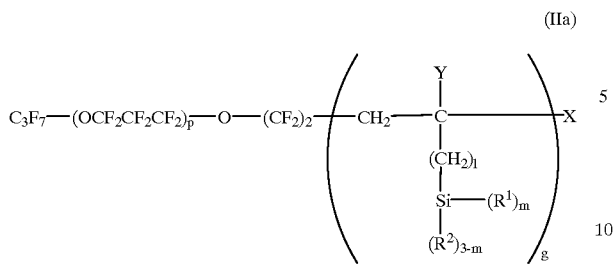

(IIa)

wherein p represents an integer of 1 or above; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; and m represents 1, 2 or 3.

5. A process for preparing the silicon-containing organic fluoropolymer according to claim 1, which comprises reacting an iodine-terminated organic fluoropolymer represented by the general formula;

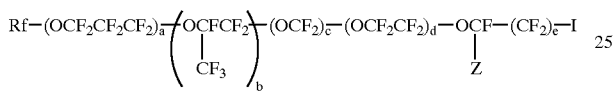

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; with a vinylsilane compound represented by the general formula:

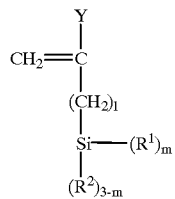

wherein Y represents hydrogen or alkyl containing 1 to 4 carbon atoms; $R^1$ represents hydroxy or a hydrolyzable substituent group; $R^2$ represents hydrogen or a monovalent hydrocarbon group; l represents 0, 1 or 2; and m represents 1, 2 or 3.

6. A process for preparing the mixture of silicon-containing organic fluoropolymers according to claim 2, which comprises reacting an iodine-terminated organic fluoropolymer represented by the general formula;

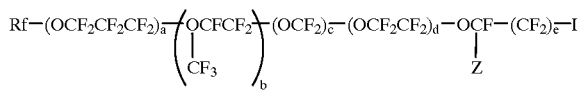

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; with a vinylsilane compound represented by the general formula:

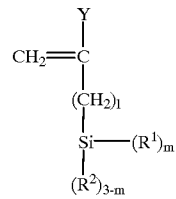

wherein Y represents hydrogen or alkyl containing 1 to 4 carbon atoms; $R^1$ represents hydroxy or a hydrolyzable substituent group; $R^2$ represents hydrogen or a monovalent hydrocarbon group; l represents 0, 1 or 2; and m represents 1, 2 or 3.

7. A surface-treating method for a substrate, which comprises coating the substrate surface with a treating solution comprising (1) a silicon-containing organic fluoropolymer represented by the general formula (Ix), (2) a fluorine-containing organic solvent and (3) a silane compound excepting said silicon-containing organic fluoropolymer (1):

(Ix)

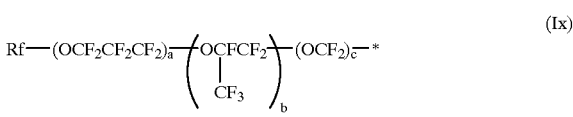

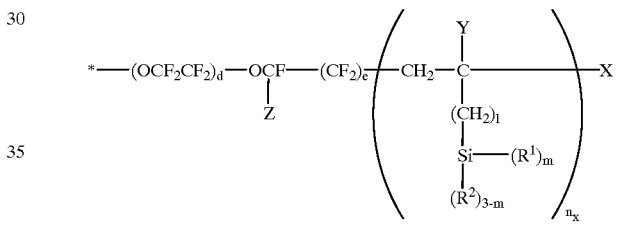

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and $n_x$ represents an integer of 1 or above.

8. A surface-treating method for a substrate, which comprises coating the substrate surface with a treating solution (N) comprising (3) a silane compound excepting a silicon-containing organic fluoropolymer (1) represented by the general formula (Ix) for forming an under-layer, and then coating the under-layer with a treating solution (M) comprising (1) the silicon-containing organic fluoropolymer and (2) a fluorine-containing organic solvent:

(Ix)

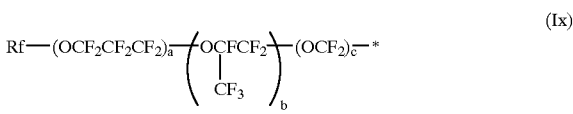

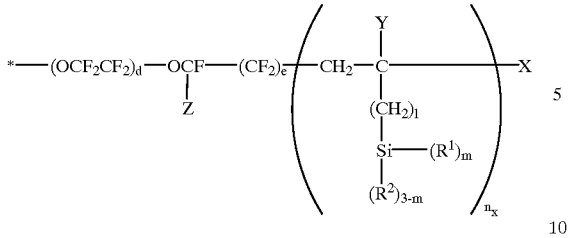

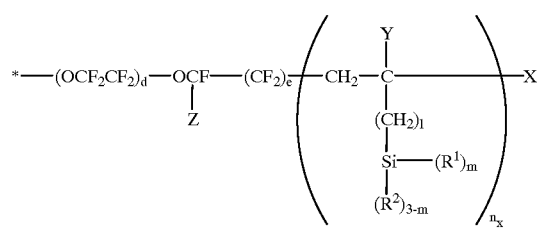

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; 1 represents 0, 1 or 2; m represents 1, 2 or 3; and $n_x$ represents an integer of 1 or above.

9. A surface-treating composition which comprises (1) a silicon-containing organic fluoropolymer represented by the general formula (Ix), (2) a fluorine-containing organic solvent and (4) an organic solvent excepting said fluorine-containing organic solvent (2):

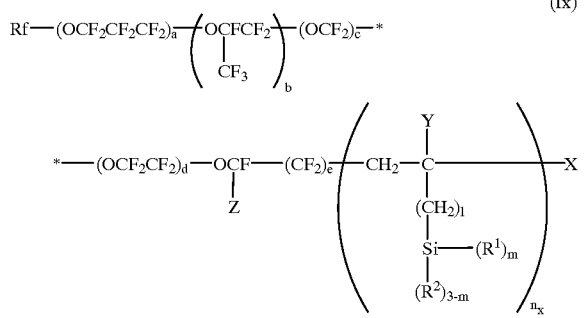

(Ix)

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; 1 represents 0, 1 or 2; m represents 1, 2 or 3; and $n_x$ represents an integer of 1 or above.

10. The surface-treating composition according to claim 9, wherein the organic solvent (4) excepting the fluorine-containing organic solvent (2) is alcohols.

11. An anti-icing agent which comprises a silicon-containing organic fluoropolymer represented by the general formula (Ix):

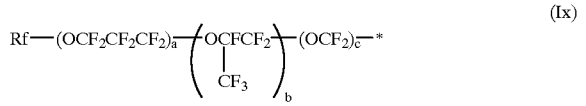

(Ix)

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; 1 represents 0, 1 or 2; m represents 1, 2 or 3; and $n_x$ represents an integer of 1 or above.

12. A water-repellent glass member which comprises a glass substrate and, as formed on the glass surface, a layer of a silicon-containing organic fluoropolymer represented by the general formula (Ix), and which is used in vehicles:

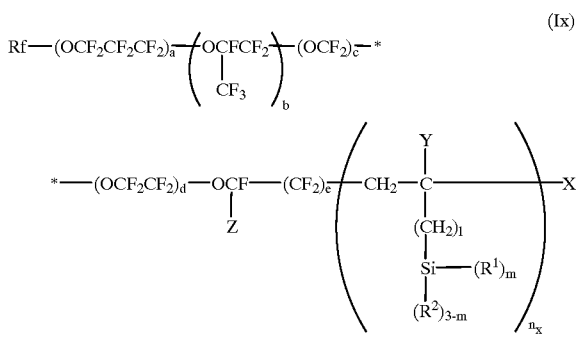

(Ix)

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; 1 represents 0, 1 or 2; m represents 1, 2 or 3; and $n_x$ represents an integer of 1 or above.

13. An antifouling substrate which comprises a substrate and, as formed on the surface thereof, a layer of a silicon-containing organic fluoropolymer represented by the general formula (Ix) and having a number average molecular weight of from $5 \times 10^2$ to $1 \times 10^5$:

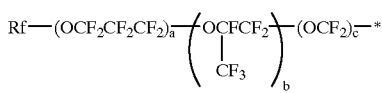

(Ix)

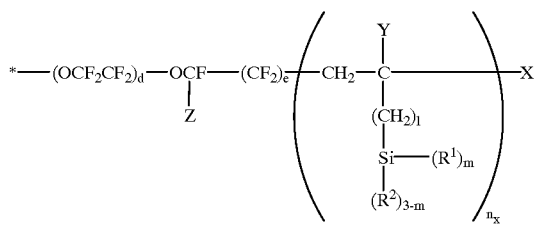

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and $n_x$ represents an integer of 2 or above.

14. A process for preparing an antifouling substrate, which comprises coating the substrate surface with a treating solution comprising a mixture of silicon-containing organic fluoropolymers represented by the general formula (Ia) and having a number average molecular weight of from $5\times10^2$ to $1\times10^5$, wherein g is 0 or an integer of 1 or above and the mean value of the g is greater than 1 in said mixture provided said mixture of silicon-containing organic fluoropolymers contains a silicon-containing organic fluoropolymer wherein the g is an integer of 2 or above:

substituent group; $R^2$ represents hydrogen or a monovalent hydrocarbon group; l represents 0, 1 or 2; and m represents 1, 2 or 3.

15. A water-repellent glass member which comprises a glass substrate and, as formed on the glass surface, a layer of a silicon-containing organic fluoropolymer represented by the general formula (Ix):

(Ix)

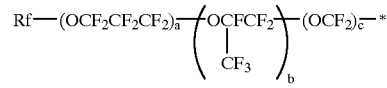

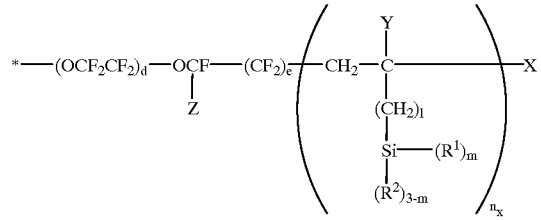

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and $n_x$ represents an integer of 2 or above.

16. A process for preparing a water-repellent glass member, which comprises coating the glass surface with a (Ia)

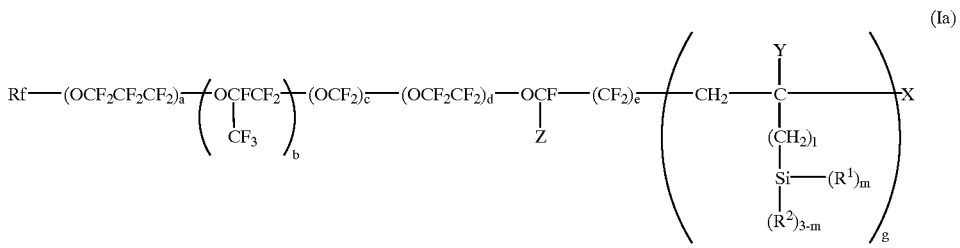

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable treating solution comprising a mixture of silicon-containing organic fluoropolymers represented by the general formula (Ia) and having a number average molecular weight of from $5\times10^2$ to $1\times10^5$, wherein g is 0 or an integer of 1 or above and the mean value of the g is greater than 1 in said mixture provided said mixture of silicon-containing organic fluoropolymers contains a silicon-containing organic fluoropolymer wherein the g is an integer of 2 or above:

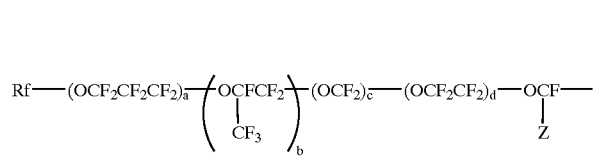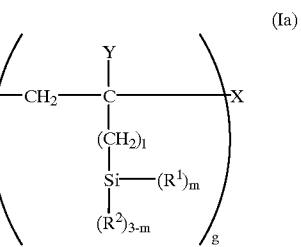

(Ia)

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occurring in the formula is not limited to that shown; Y represents hydrogen or alkyl containing 1 to 4 carbon atoms; X represents hydrogen, bromo or iodo; $R^1$ represents hydroxy or a hydrolyzable substituent group; R2 represents hydrogen or a monovalent hydrocarbon group; 1 represents 0, 1 or 2; and m represents 1, 2 or 3.

* * * * *